United States Patent [19]

Wada et al.

[11] 4,146,691
[45] Mar. 27, 1979

[54] PROCESS FOR PRODUCING CYCLOPENTADIENE RESINS

[75] Inventors: Akira Wada, Kamakura; Takao Okuda, Yokohama; Risoh Iwata, Kamakura, all of Japan

[73] Assignee: Nippon Zeon Co., Ltd., Tokyo, Japan

[21] Appl. No.: 855,460

[22] Filed: Nov. 28, 1977

[30] Foreign Application Priority Data

Dec. 13, 1976 [JP] Japan ............................. 51-149594

[51] Int. Cl.$^2$ ............................................. C08F 232/06
[52] U.S. Cl. ........................................ 526/60; 526/67; 526/68; 526/308
[58] Field of Search .................. 526/60, 67, 68, 308

[56] References Cited

U.S. PATENT DOCUMENTS

| 2,559,790 | 7/1951 | Peters | 260/17 |
| 2,689,232 | 9/1954 | Gerhart | 260/23.7 |
| 3,084,147 | 4/1963 | Wilks | 260/93.1 |
| 3,962,198 | 6/1976 | Wada et al. | 526/308 |
| 4,037,038 | 7/1977 | Tsuchiya | 526/308 |
| 4,048,132 | 9/1977 | Tsuchiya et al. | 526/308 |

*Primary Examiner*—Alan Holler
*Attorney, Agent, or Firm*—Sherman & Shalloway

[57] ABSTRACT

A process for producing a cyclopentadiene resin by heat copolymerizing a cyclopentadiene monomer and a comonomer copolymerizable therewith, which comprises
  (a) using a vinyl monomer containing an ester linkage or a hydroxyl group as the comonomer, and
  (2) feeding the polymerizable ingredients and optionally an inert solvent from a material-preparing zone to a polymerization zone to polymerize the polymerizable ingredients, feeding the polymer solution formed in the polymerization zone into a separating zone to separate a low-boiling mixture consisting of the unreacted monomers, a by-product oil and optionally the inert solvent from the resulting cyclopentadiene resin, and recycling at least a part of the separated low-boiling mixture to the material-preparing zone for use as a polymerizable ingredient.

11 Claims, 1 Drawing Figure

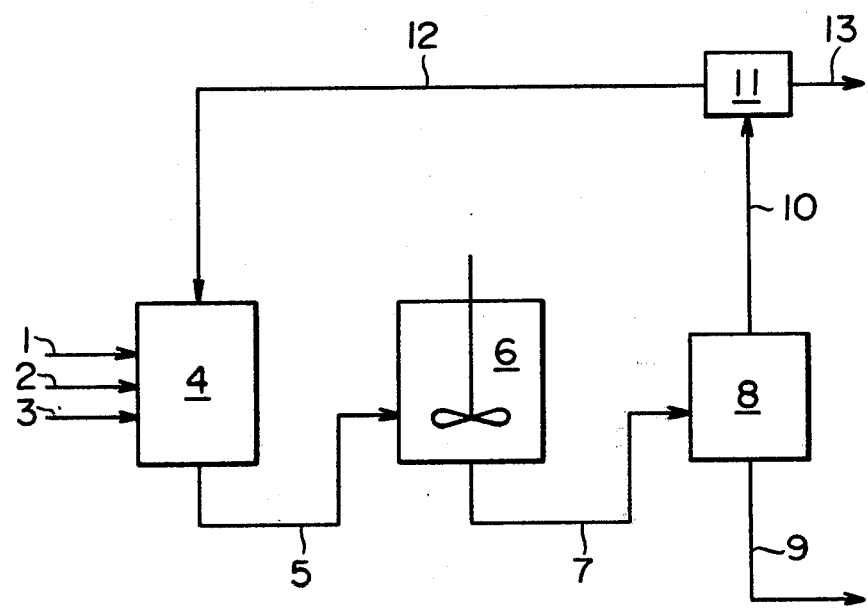

PROCESS FOR PRODUCING CYCLOPENTADIENE RESINS

This invention relates to a novel process for producing cyclopentadiene resins. More specifically, the invention relates to a process for producing cyclopentadiene resins with superior productivity using as a polymerizable ingredient an oily polymer fraction formed as a by-product in the polymerization system.

Methods have long been known for heat polymerizing a cyclopentadiene monomer such as cyclopentadiene or dicyclopentadiene with or without a comonomer such as styrene, vinyl acetate, methyl methacrylate, allyl alcohol or isoprene. The resulting cyclopentadiene resins have been widely used as a tackiness-imparting agent in the fields of paints, inks, adhesives and rubber compounding agents same as rosin, and aliphatic or aromatic hydrocarbon resins.

Unlike rubbery polymers, resins used as tackiness-imparting agents are generally polymers having a low degree of polymerization, and in many cases, contain an oily product comprising the dimer, trimer and tetramer formed as by-products during their production. The oily product will reduce the softening points of the resins, or will volatilize off from the resins in use to give off an offensive odor. It is necessary therefore to remove the oily product from the resulting resins irrespective of the method of production used. For example, in the production of aliphatic or aromatic hydrocarbon resins by cationic polymerization, the oily product is separated by first removing the catalyst from the polymerization product and then steam-distilling the product. The oily product so separated has an exceedingly low polymerization activity, and cannot be reused as a polymerizable ingredient in general polymerization methods such as cationic polymerization. Hence, the oily product has been a cause of increasing the unit cost of production. Especially when two or more monomers are co-polymerized, the composition of the resulting oily product is complicated, and the properties of the oily product vary according to its composition. It has been desired therefore to develop a method for effectively utilizing such an oily product.

It is a primary object of this invention therefore to provide a process for producing cyclopentadiene resins with good efficiency by utilizing a by-product oily product as a polymerizable ingredient.

Another object of this invention is to provide a process for producing cyclopentadiene resins, which makes it possible to decrease wastes from the manufacturing process, and to perform production in a closed system.

We have found that if a specified comonomer is used, the by-product oil has the same degree of polymerization activity as fresh monomers, and the properties of a resin obtained by polymerization in the presence of the oil are not at all impaired.

According to this invention, there is provided a process for producing cyclopentadiene resins by heat-copolymerizing a cyclopentadiene monomer and a comonomer copolymerizable therewith, which comprises (1) using a vinyl monomer containing an ester linkage or a hydroxyl group as the comonomer, and (2) feeding the polymerizable ingredients and optionally an inert solvent from a material-preparing zone to a polymerization zone to polymerize the polymerizable ingredients, feeding the polymer solution formed in the polymerization zone into a separating zone to separate a low-boiling mixture consisting of the unreacted monomers and a by-product oil and optionally the inert solvent from the resulting cyclopentadiene resin, and recycling at least a part of the separated low-boiling mixture to the material-preparing zone for use as a polymerizable ingredient.

Methods have already been known for heat-copolymerizing a cyclopentadiene monomer such as cyclopentadiene, methylcyclopentadiene, or a dimer, trimer or codimer thereof with a comonomer such as a monolefin, conjugated diolefin, unsaturated aldehyde, unsaturated carboxylic acid ester or unsaturated alcohol. Of these comonomers, vinyl monomers having an ester linkage or a hydroxyl group are selectively used in the present invention. When such vinyl monomers are used as comonomers in accordance with the present invention, the by-product oil which contains a codimer or cotrimer of the cyclopentadiene monomer and the vinyl monomer, etc. has the same polymerization activity as the fresh monomers. Moreover, resins obtained in a system in which the by-product oil is one of the polymerizable ingredients exhibit properties comparable to resins which are obtained in a system which uses only the fresh monomers.

The vinyl monomer containing an ester linkage which is used as a comonomer in the present invention is a compound expressed by the general formula

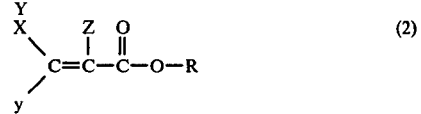

wherein X, Y and Z represent hydrogen or a methyl group, and R represents an alkyl group with 1 to 8 carbon atoms. Specific examples of such a vinyl monomer are fatty acid esters of unsaturated alcohols such as vinyl acetate, vinyl propionate or vinyl butyrate, and alkyl esters of $\alpha,\beta$-unsaturated carboxylic acids such as methyl acrylate, methyl methacrylate, methyl crotonate, ethyl acrylate, butyl acrylate or 2-ethylhexyl acrylate. Of these, vinyl acetate is especially preferred.

The vinyl monomer containing a hydroxyl group which is also used as a comonomer in the present invention is a monohydric or polyhydric monolefinically unsaturated alcohol containing 3 to 6 carbon atoms. Specific examples include allyl alcohol, crotyl alcohol, 1,4-butenediol, 1,2-butenediol, and 3-hexene-2,5-diol. Of these, allyl alcohol is especially preferred.

If another monomer, for example isoprene, is used instead of such specified monomers, the yield of the resin will be decreased with increasing amount of the by-product oil or the softening point of the resin will be lowered. If acrolein is used, the yield of the resin will be also decreased, and the heavy coloration of the resin will occur.

According to the process of this invention, the cyclopentadiene monomer and the vinyl monomer containing an ester linkage or a hydroxyl group are co-polymerized under heat in a customary manner. The proportions of the materials generally differ according to the properties required of the final resin. Usually, the proportion of the former is 90 to 50% by weight, and that of the latter is 10 to 50% by weight, based on the monomeric mixture used. A cyclopentadiene resin having a softening point of 50° to 170° C. and a Gardner color number of not more than 12 is obtained by heat polymerizing the monomeric mixture at a temperature of 250° to 300° C. for a period of 0.5 to 20 hours in the presence or absence of a known inert solvent such as benzene, toluene, xylene, tetralin or kerosene. In order to increase the quality of the resin and the efficiency of production, it is preferred to perform the polymerization in an atmosphere of an inert gas such as nitrogen or argon until the yield of the final resin becomes at least 50% by weight.

The polymerization in the polymerization zone is performed either batchwise or continuously. Since the reaction of forming cyclopentadiene resins requires high temperatures and is exothermic, temperature control is extremely difficult in a batchwise polymerization especially at high monomer concentrations, and consequently, the resulting resin tends to have greatly fluctuating softening points or to have deteriorated colors. In contrast, the continuous polymerization permits an easy control of temperature, and consequently affords resin having good colors and stabilized softening points. Moreover, productivity is far higher than in the case of the batchwise polymerization. Continuous polymerization in the absence of an inert solvent is very effective because it permits an increase in the concentration of the resin in the polymerization system. Since, however, temperature control becomes difficult with increasing resin concentration, the suitable resin concentration in the polymerization system is generally not more than 80% by weight.

The polymer solution formed in the polymerization zone is then fed into the separating zone where a low-boiling mixture consisting of the unreacted monomers and a by-product oil and optionally the inert solvent is separated from the desired cyclopentadiene resin. In order to separate the oil completely, it is necessary to distill the polymer solution at a high temperature under reduced pressure. Specifically, the distillation is performed at a temperature of 150° to 300° C. and a pressure of not more than 300 mmHg. The method of distillation is not particularly limited, and any known methods such as vacuum distillation, flash distillation or thin film distillation can be used. Steam distillation, however, has some disadvantage in that because the introduction of steam causes the need to discharge the condensed water from the system and to dry the remaining resin, it is difficult to perform the process in a closed system.

At least a part of the low-boiling mixture separated in the separating zone is recycled to the material-preparing zone, and the unreacted monomers and the oil contained in it are used again as polymerizable ingredients. Since the ingredients which constitute the by-product oil, that is the codimer, cotrimer, etc., all have the same degrees of polymerization activity as the unreacted monomers, it is not altogether necessary to separate the unreacted monomers from the by-product oil at the time of recycling, and they may be recycled as a mixture. In order to perform the process in a closed system and to utilize the by-product oil effectively, the largest possible portion of the low-boiling mixture is preferably recycled. Generally, it is desirable to recycle at least 50% by weight, especially at least 80% by weight, of the unreacted monomers and the by-product oil. Of course, the entire low-boiling mixture can be recycled.

The low-boiling mixture recycled to the material-preparing zone is mixed with a desired proportion of fresh monomers, and again fed into the polymerization zone.

Generally, the composition of the monomer feed stock needs to be maintained constant to produce a resin having uniform properties continuously. When the by-product oil is used as polymerizable ingredient, the composition of the monomeric mixture is difficult to adjust because the composition of the by-product oil is not constant. In the present invention, however, the ratio of the cyclopentadiene monomer to the comonomer in the monomer feed stock can be easily and accurately controlled by measuring the ester value or hydroxyl value of the polymerizable ingredients because the comonomer used is a vinyl monomer containing an ester linkage or hydroxyl group. The composition of the monomeric mixture can of course be adjusted also by analyzing the by-product oil by an instrumental technique such as gas chromatography.

The process of the invention is illustrated below by referring to the accompanying drawing which is a flow sheet showing one preferred embodiment of the present invention.

A cyclopentadiene monomer, a vinyl monomer containing an ester linkage or a hydroxyl group, and a by-product oil are fed into a material-preparing tank 4 through lines 1, 2 and 12, respectively. The amounts of the monomers fed are adjusted so that the ester value or hydroxyl value of the polymerizable ingredient become constant. If desired, an inert solvent is fed from line 3. The polymerizable mixture is fed into a polymerization tank 6 through a line 5 where it is heat polymerized batchwise or continuously. The polymer solution formed in the polymerization tank 6 is fed into a distillation device 8 through a line 7. The low-boiling mixture which distills from the distillation device 8 is sent to a reserve tank 11 through a line 10, and from it, recycled to the material-preparation tank through line 12. If desired, a part of the low-boiling mixture may be discharged out of the system through a line 13. The cyclopentadiene resin separated from the low-boiling mixture is discharged from the distillation device 8 through line 9, and recovered.

According to the present invention described hereinabove, the by-product oil heretofore disposed of as a waste can be effectively utilized, and the yield of the final resin can be exceedingly increased. Furthermore, since the polymerization in the process of this invention is heat polymerization, it does not require a step of removing the catalyst, and the use of steam can be obviated in separating the low-boiling mixture. The waste to be discharged from the manufacturing process can thus be reduced to a minimum. For this reason, the process of this invention can be performed in a closed system which is not available in the conventional techniques of producing hydrocarbon resins. Furthermore, according to the present invention, the polymer solution maintained at a high temperature can be fed into the separating zone without cooling it, and the low-boiling mixture can be separated from the cyclopentadiene resin by utilizing the heat of the polymer solution. The process of the invention is also effective from the standpoint of heat efficiency.

The following examples illustrates the invention more specifically. In these examples, all parts and percentages are by weight.

REFERENTIAL EXAMPLE

Each of monomeric mixtures having the compositions shown in Table 1 was charged into a pressure-resistant autoclave, and heat polymerized at 260° C. for 4 hours. The product was distilled at 250° C. and 5 mmHg to distill off a low-boiling mixture consisting of the unreacted monomers and a by-product oil, and thereby to obtain a cyclopentadiene resin. The yields and properties of the resins were measured, and the results are shown in Table 1.

Table 1

| Monomeric mixture | A | B | C | D |
|---|---|---|---|---|
| Dicyclopentadiene (parts) | 70 | 70 | 70 | 70 |
| Vinyl acetate | 30 | — | — | — |
| Allyl alcohol | — | 30 | — | — |
| Isoprene | — | — | 30 | — |
| Acrolein | — | — | — | 30 |
| Yield of the resin (%) | 78.0 | 76.0 | 56.8 | 62.5 |
| Properties of the resin | | | | |
| Softening point (° C.) | 103 | 98 | 120 | 160 |
| Gardner color | 5 | 8 | 5 | 9 |

EXAMPLE 1

The same polymerization as in Referential Example was performed except that 50 parts of each of the low-boiling mixtures A, B, C and D (the letters corresponding to those designating the monomeric mixtures) was used in admixture with 50 parts of each of the monomeric mixtures A, B, C and D. The results are shown in Table 2.

Table 2

| Run No. | 1 | 2 | 3 | 4 |
|---|---|---|---|---|
| Monomeric mixture | A | B | C | D |
| Low-boiling mixture | A | B | C | D |
| Yield of the resin (%) | 77.5 | 76.5 | 48.5 | 51.0 |
| Properties of the resin (%) | | | | |
| Softening point (° C.) | 100 | 95 | 101 | 131 |
| Gardner color | 5 | 8 | 6 | 15 |

The results show that when vinyl acetate or allyl alcohol is used as a comonomer (Runs Nos. 1 and 2), the reuse of the unreacted monomers and by-product oil does not at all adversely affect the polymerization activity of the monomeric feed stock and the properties of the final resin. In contrast, when isoprene or acrolein is used as a comonomer (Runs Nos. 3 and 4), the yield of the resin drastically decreases, and the softening point and color of the resin are adversely affected.

EXAMPLE 2

A monomeric mixture (ester value 195) of 70% of dicyclopentadiene and 30% of vinyl acetate which had been prepared in a material-preparing tank was continuously fed into a polymerization tank at such a feed rate that its residence time was 4 hours. The monomeric mixture was continuously polymerized in an atmosphere of nitrogen while maintaining the temperature of the system at about 260° C. At this time, the concentration of the resin in the polymerization system was maintained at about 70%. The resulting polymer solution was continuously fed from the polymerization tank into a separating zone where it was subjected to flash distillation at 250° C. and 6 mmHg to separate into a cyclopentadiene resin and a low-boiling mixture.

The yield of the resin was about 70.5%. The resin had a softening point of 98° C. and a Gardner color of 5.

The entire low-boiling mixture separated was recycled to the material-preparing tank, and fresh dicyclopentadiene and vinyl acetate were fed into it so that the ester value of the entire mixture became 195. The polymerization was continued for 50 hours. There was scarcely any appreciable change in the polymerization activity of the monomeric mixture and the properties of the resulting resin.

EXAMPLE 3

Continuous polymerization was performed in the same way as in Example 2 except that allyl alcohol was used instead of the vinyl acetate (the monomeric mixture had a hydroxyl value of 285). The concentration of the resin in the system was maintained at about 68%.

The yield of the resin was 68%. The resin had a softening point of 102° C. and a Gardner color of 8.

The entire low-boiling mixture was recycled in the same way as in Example 2, and while adjusting the hydroxyl value of the monomeric mixture to 285, the polymerization was continued for 30 hours. There was scarcely any appreciable change in the polymerization activity of the monomeric mixture and the properties of the resin.

CONTROL EXAMPLE

Continuous polymerization was performed in the same way as in Example 2 except that isoprene was used instead of vinyl acetate. The concentration of the resin in the system was maintained at about 62.5%.

The yield of the resin was 62.5%. The resin had a softening point of 100° C. and a Gardner color of 5.

The entire low-boiling mixture recovered was recycled in the same way as in Example 2, and the polymerization was continued while adjusting the isoprene content of the polymerizable ingredient to 30% by gas chromatography. The polymerization activity of the monomeric mixture decreased gradually, and in 30 hours after the starting of the operation, the concentration of the resin in the system decreased to 55%.

What is claimed is:

1. A process for producing a cyclopentadiene resin by heat copolymerizing a cyclopentadiene monomer and a comonomer copolymerizable therewith, which comprises (1) using a vinyl monomer selected from the group consisting of (i) a compound expressed by the general formula

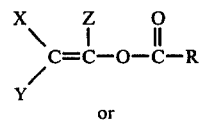

or

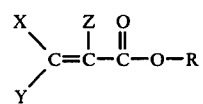

wherein X, Y and Z represent hydrogen or a methyl group, and R represents an alkyl group with 1 to 8 carbon atoms, and (ii) a monohydric or polyhydric monolefinically unsaturated alcohol containing 3 to 6 carbon atoms as the comonomer, and (2) feeding the polymerizable ingredients from a material-preparing zone to a polymerization zone to polymerize them, feeding the polymer solution formed in the polymerization zone into a separating zone to separate a low-boiling mixture consisting of the unreacted nonomers and a by-product oil from the resulting cyclopentadiene resin, and recycling at least a part of the separated low-boiling mixture to the material-preparing zone for use as a polymerizable ingredient.

2. The process of claim 1 wherein at least 50% by weight of the low-boiling mixture separated from the cyclopentadiene resin is recycled to the material-preparing zone.

3. The process of claim 1 wherein the separation of the low-boiling mixture from the cyclopentadiene resin is performed in the absence of steam at a high temperature under reduced pressure.

4. The process of claim 1 wherein the polymerization in the polymerization zone is carried out continuously.

5. The process of claim 1 wherein the polymerization in the polymerization zone is carried out at a temperature of 250° to 300° C.

6. The process of claim 1 wherein the vinyl monomer used as the comonomer is a fatty acid ester of a monolefinically unsaturated alcohol.

7. A process for producing a cyclopentadiene resin by heat copolymerizing a cyclopentadiene monomer and a comonomer copolymerizable therewith, which comprises (1) using a vinyl monomer selected from the group consisting of (i) a compound expressed by the general formula

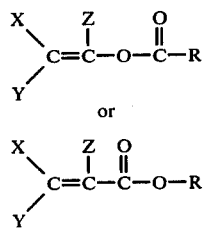

wherein X, Y and Z represent hydrogen or a methyl group, and R represents an alkyl group with 1 to 8 carbon atoms, and (ii) a monohydric or polyhydric monolefinically unsaturated alcohol containing 3 to 6 carbon atoms as the comonomer, and (2) feeding the polymerizable ingredients and an inert solvent from a material-preparing zone to a polymerization zone to polymerize the polymerizable ingredients, feeding the polymer solution formed in the polymerization zone into a separating zone to separate a low-boiling mixture consisting of the unreacted monomers, a by-product oil and the inert solvent from the resulting cyclopentadiene resin, and recycling at least a part of the separated low-boiling mixture to the material-preparing zone for use as a polymerizable ingredient.

8. A process for producing a cyclopentadiene resin by heat polymerizing a cyclopentadiene monomer and a comonomer copolymerizable therewith, which comprises (1) using a vinyl monomer selected from the group consisting of (i) a compound expressed by the general formula

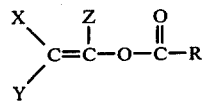

or

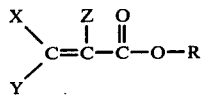

wherein X, Y and Z represent hydrogen or a methyl group, and R represents an alkyl group with 1 to 8 carbon atoms, and (ii) a monohydric or polyhydric monolefinically unsaturated alcohol containing 3 to 6 carbon atoms as the comonomer, (2) feeding the polymerizable ingredients from a material-preparing zone to a polymerization zone to polymerize them, feeding the polymer solution formed in the polymerization zone into a separating zone to separate a low-boiling mixture consisting of the unreacted monomer and a by-product oil from the resulting cyclopentadiene resin, and recycling at least a part of the separated low-boiling mixture to the material-preparing zone for use as a polymerizable ingredient, and (3) adjusting the composition of the polymerizable ingredients in the material-preparing zone by adding additional comonomer to the polymerizable ingredients to maintain the ester value or hydroxyl value of the polymerizable ingredients at a constant value.

9. A process for producing a cyclopentadiene resin by heat polymerizing a cyclopentadiene monomer and a comonomer copolymerizable therewith, which comprises (1) using a vinyl monomer selected from the group consisting of (i) a compound expressed by the general formula

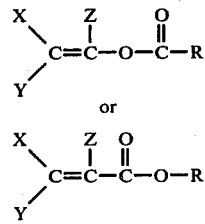

wherein X, Y and Z represent hydrogen or a methyl group, and R represents an alkyl group with 1 to 8 carbon atoms, and (ii) a monohydric or polyhydric monolefinically unsaturated alcohol containing 3 to 6 carbon atoms as the comonomer, (2) feeding the polymerizable ingredients and an inert solvent from a material-preparing zone to a polymerization zone to polymerize the polymerizable ingredients, feeding the polymer solution formed in the polymerization zone into a separating zone to separate a low-boiling mixture consisting of the unreacted monomer, a by-product oil and the inert solvent from the resulting cyclopentadiene resin, and recycling at least a part of the separated low-boiling mixture to the material-preparing zone for use as a polymerizable ingredient, and (3) adjusting the composition of the polymerizable ingredients in the material-preparing zone by adding additional comonomer to maintain the ester value or hydroxyl value of the polymerizable ingredients at a constant value.

10. The process of claim 1 wherein the vinyl monomer used as the comonomer is vinyl acetate.

11. The process of claim 1 wherein the vinyl monomer used as the comonomer is allyl alcohol.

* * * * *